United States Patent
Maruoka et al.

(10) Patent No.: US 9,396,401 B2
(45) Date of Patent: Jul. 19, 2016

(54) OBSTACLE ALARM DEVICE

(75) Inventors: Tetsuya Maruoka, Anjo (JP); Akira Kadoya, Kitanagoya (JP); Keigo Ikeda, Anjo (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 596 days.

(21) Appl. No.: 13/483,699

(22) Filed: May 30, 2012

(65) Prior Publication Data

US 2013/0107050 A1    May 2, 2013

Related U.S. Application Data (63) Continuation-in-part of application No. PCT/JP2012/051360, filed on Jan. 23, 2012, and a continuation-in-part of application No. PCT/JP2011/075127, filed on Nov. 1, 2011.

(51) Int. Cl.
  *G06K 9/00* (2006.01)
  *G08G 1/0962* (2006.01)
  *G08G 1/16* (2006.01)

(52) U.S. Cl.
  CPC .......... *G06K 9/00805* (2013.01); *G08G 1/0962* (2013.01); *G08G 1/166* (2013.01); *G08G 1/168* (2013.01)

(58) Field of Classification Search
  CPC ...................... B60R 2300/105; B62D 15/0285
  See application file for complete search history.

(56) References Cited

U.S. PATENT DOCUMENTS

| | | | | |
|---|---|---|---|---|
| 7,043,346 | B2* | 5/2006 | Kubota | B62D 15/0285 340/932.2 |
| 2009/0268074 | A1* | 10/2009 | Sugino | H04N 5/23293 348/333.02 |
| 2010/0118146 | A1* | 5/2010 | Schofield et al. | 348/148 |
| 2010/0134264 | A1* | 6/2010 | Nagamine | B60Q 9/005 340/435 |
| 2010/0219010 | A1* | 9/2010 | Kadowaki | B62D 15/0285 180/204 |
| 2011/0025848 | A1* | 2/2011 | Yumiba | B60R 1/00 348/148 |

(Continued)

FOREIGN PATENT DOCUMENTS

| | | |
|---|---|---|
| JP | 11-115660 A | 4/1999 |
| JP | 2008-257378 A | 10/2008 |
| JP | 2009-040272 A | 2/2009 |

(Continued)

OTHER PUBLICATIONS

International Search Report of PCT/JP2012/051360, dated Apr. 10, 2012.

(Continued)

*Primary Examiner* — William C Vaughn, Jr.
*Assistant Examiner* — Jerry Jean Baptiste
(74) *Attorney, Agent, or Firm* — Sughrue Mion, PLLC (57) ABSTRACT

An obstacle alarm device for clearly indicating to a driver the presence of an obstacle approaching a vehicle. The obstacle alarm device has a captured image acquisition unit for acquiring a captured image; an attention-prioritized region setting unit for setting an attention-prioritized region to be the captured image; an outside region setting unit for setting an outside region to be outside the attention-prioritized region within the captured image; an object presence determination unit for determining whether or not an object is present in the outside region; a movement direction determination unit for determining a movement direction of the object; and a clear indication image output unit.

8 Claims, 9 Drawing Sheets

(56) References Cited

U.S. PATENT DOCUMENTS

2011/0128138 A1* 6/2011 Yamamoto ........ B60W 30/0956 340/436
2011/0285850 A1* 11/2011 Lu et al. ........................ 348/148

FOREIGN PATENT DOCUMENTS

| JP | 2009-217740 A | 9/2009 |
| JP | 2009-265803 A | 11/2009 |
| JP | 2010-009607 A | 1/2010 |
| JP | 2011-151479 A | 8/2011 |

OTHER PUBLICATIONS

International Search Report of PCT/JP2011/075127, dated Dec. 13, 2011.

* cited by examiner

Fig.2A (ACTUAL IMAGE-CAPTURING CIRCUMSTANCES)

Fig.2D CLEAR INDICATION IMAGE STORAGE UNIT

OBSTACLE ALARM DEVICE

BACKGROUND OF THE INVENTION

1. Field of the Invention

The present invention relates to an obstacle alarm device for clearly indicating, to an occupant, the presence of an obstacle approaching a vehicle.

2. Description of the Related Art

The periphery of a vehicle includes blind spots which cannot be viewed from the position of the driver, and the driver must pay close, careful attention to the periphery of the vehicle when driving the vehicle. In particular, in a case where a vehicle is being driven in reverse and parked, many users have a poor awareness of the actual act of parking, and the mental fatigue as well is not negligible. In view whereof, conventionally technology for monitoring an obstacle in the periphery of the vehicle has been used (for example, Patent Documents 1 and 2).

A vehicle obstacle alarm device recited in Patent Document 1 is configured to comprise lateral movement obstacle detecting means, lateral movement direction detecting means, and lateral movement information providing means. The lateral movement obstacle detecting means detects an obstacle moving in front of the vehicle in a direction intersecting a direction of travel. The lateral movement direction detecting means detects the lateral movement direction of the obstacle detected by the lateral movement obstacle detecting means. The lateral movement information providing means provides a driver with information relating to the lateral movement direction of the obstacle detected by the lateral movement direction detecting means. Therein, the lateral direction information providing means displays, on a display, an arrow representing the lateral movement direction detected by the lateral movement direction detecting means, on a display unit.

A vehicle periphery monitoring device recited in Patent Document 2 is configured to comprise image-capturing means, obstacle detecting means, and displaying means. The image-capturing means captures an image of a vehicle periphery, including a part of an automobile. The obstacle detecting means detects an obstacle located in the vehicle periphery, and calculates the distance between the detected obstacle and the automobile. The displaying means displays, on a single screen, a captured image captured by the image-capturing means as well as an obstacle display image illustrating the distance calculated by the obstacle detecting means.

PATENT DOCUMENTS

[Patent Document 1] Japanese Laid-open Patent Publication No. 11-115660
[Patent Document 2] Japanese Laid-open Patent Publication No. 2009-217740

As per the technologies recited in Patent Document 1 and Patent Document 2, the obstacle in the periphery of the vehicle is detected and a screen displays information (an arrow or the like) clearly indicating the obstacle, thereby making it possible to inform a driver of the presence of the obstacle in the periphery of the vehicle. However, a display built into a vehicle (the displaying means) is not one having a large screen size. For this reason, when the arrow or the like is displayed on an image for illustrating the circumstances of the periphery of the vehicle displayed on the display, there is the possibility that it will become difficult to see the circumstances of the periphery of the vehicle, or that it will become impossible to be made aware of the obstacle.

In view of the foregoing problem, it is an objective of the present invention to provide an obstacle alarm device making it possible to clearly indicate the presence of an obstacle approaching the vehicle to the driver without it becoming difficult to see the circumstances of the periphery of the vehicle.

SUMMARY OF THE INVENTION

A technical aspect of the obstacle alarm device according to the present invention adapted to achieve the aforesaid aim comprises:

a captured image acquisition unit for acquiring a captured image in which an image of a visual scene of a periphery of a vehicle has been captured;

an attention-prioritized region setting unit for setting an attention-prioritized region to be the captured image;

an outside region setting unit for setting an outside region to be outside the attention-prioritized region in the captured image;

an object presence determination unit for determining whether or not an object is present in the outside region;

a movement direction determination unit for determining a movement direction of the object; and a clear indication image output unit for causing a sign, which is turned on for a fixed duration of time and thereafter turned off, to be displayed at sequentially varying positions centerward from a side of the outside region where the object is present, within the attention-prioritized region displayed together with the outside region, in a case where the movement direction determination unit has determined that the object is moving toward the center of the attention-prioritized region.

According to the technical aspect of such description, because the sign is displayed within the attention-prioritized region in accordance with the object approaching the vehicle, it is possible for the presence and the direction of the object approaching the vehicle to be clearly indicated to the driver without there being a decrease in the visibility of the object approaching the vehicle nor in the visibility of the circumstances of the periphery of the vehicle. Accordingly, an object approaching the vehicle will no longer go unnoticed even in a case where the screen size of the display device is small. In this manner, according to the present invention, it becomes possible for the presence of an obstacle (the object) approaching the vehicle to be clearly indicated to the driver without it becoming harder to see the circumstances of the periphery of the vehicle.

Preferably, the clear indication image output unit repeatedly performs the display of the sign.

According to the technical aspect of such description, it is possible to prevent the clear indication of the presence of the obstacle approaching the vehicle from going unnoticed by the driver.

Preferably, the sign is configured to be arrow-shaped, having a convex part projecting toward the center of the attention-prioritized region.

According to the technical aspect of such description, because the direction of movement of the obstacle and the direction toward which the convex part faces are matched together, the driver is able to recognize the direction of movement of the obstacle in an intuitive manner.

Preferably, the clear indication image output unit is configured to produce, in a case where there are a plurality of the signs, a display at a position where the plurality of the signs are partially superimposed onto each other, and to superimpose a sign displayed later on a sign displayed immediately prior for the overlapping portion between the sign to be displayed later and the sign displayed immediately prior.

According to the technical aspect of such description, the signs can be displayed as though heading toward the center of the screen. Accordingly, the driver is more readily able to recognize the approach of the obstacle intuitively.

It is also possible, for example, for the sign to be made to be a part of a frame sign made of a frame shape for surrounding a predetermined region within the attention-prioritized region.

With the technical aspect of such description, too, it is possible to use the sign to clearly indicate, to the driver, the presence of the obstacle approaching the vehicle. Further, because the visual scenery of the periphery of the vehicle is displayed in the region surrounded by the frame sign configured to comprise the sign of such description, it will still not be hard for the driver to see the circumstances of the periphery of the vehicle. Accordingly, it becomes possible for the presence of the obstacle approaching the vehicle to be clearly indicated to the driver without it becoming harder to see the circumstances of the periphery of the vehicle.

Preferably, the frame sign is caused to be displayed at sequentially varying positions centerward from an outer edge part of the attention-prioritized region in accordance with the movement of a part of the frame sign toward the center of the attention-prioritized region.

According to the technical aspect of such description, the frame sign can also be displayed moving toward the center of the attention-prioritized region in accordance with the movement of the object approaching the vehicle. For this reason, the frame sign will not cause there to be a decrease in the visibility of the object moving toward the center of the attention-prioritized region.

Preferably, in a case where there are a plurality of the frame signs, a frame sign to be displayed later is of smaller size than a frame sign displayed immediately prior.

According to the technical aspect of such description, the frame signs can be displayed as though heading toward the center of the screen. Accordingly, the driver is more readily able to recognize the approach of the obstacle.

Preferably, in a case where there are a plurality of the frame signs, a frame sign displayed later is of lower transparency than a frame sign displayed immediately prior.

According to the technical aspect of such description, the frame signs can be displayed as though heading towards the center of the screen. Accordingly, the driver is more readily able to recognize the approach of the obstacle.

Preferably, there is adopted a configuration such that the clear indication image output unit discontinues the outputting of the sign in a case where the object has entered the attention-prioritized region.

According to the technical aspect of such description, because the display of the frame sign can be discontinued at a point in time where the object is represented within the attention-prioritized region, the object will not be hidden by the sign. Accordingly, it is possible for the object having approached the vehicle to be appropriately viewed.

DESCRIPTION OF THE PREFERRED EMBODIMENTS

1. First Embodiment

The following is a detailed description of an embodiment of the present invention. An obstacle alarm device 100 according to the present invention is provided with a function for clearly indicating to a driver of a vehicle, in a case where an object approaching the vehicle exists, that the object is approaching. The following description refers to the accompanying drawings.

Figure 1:
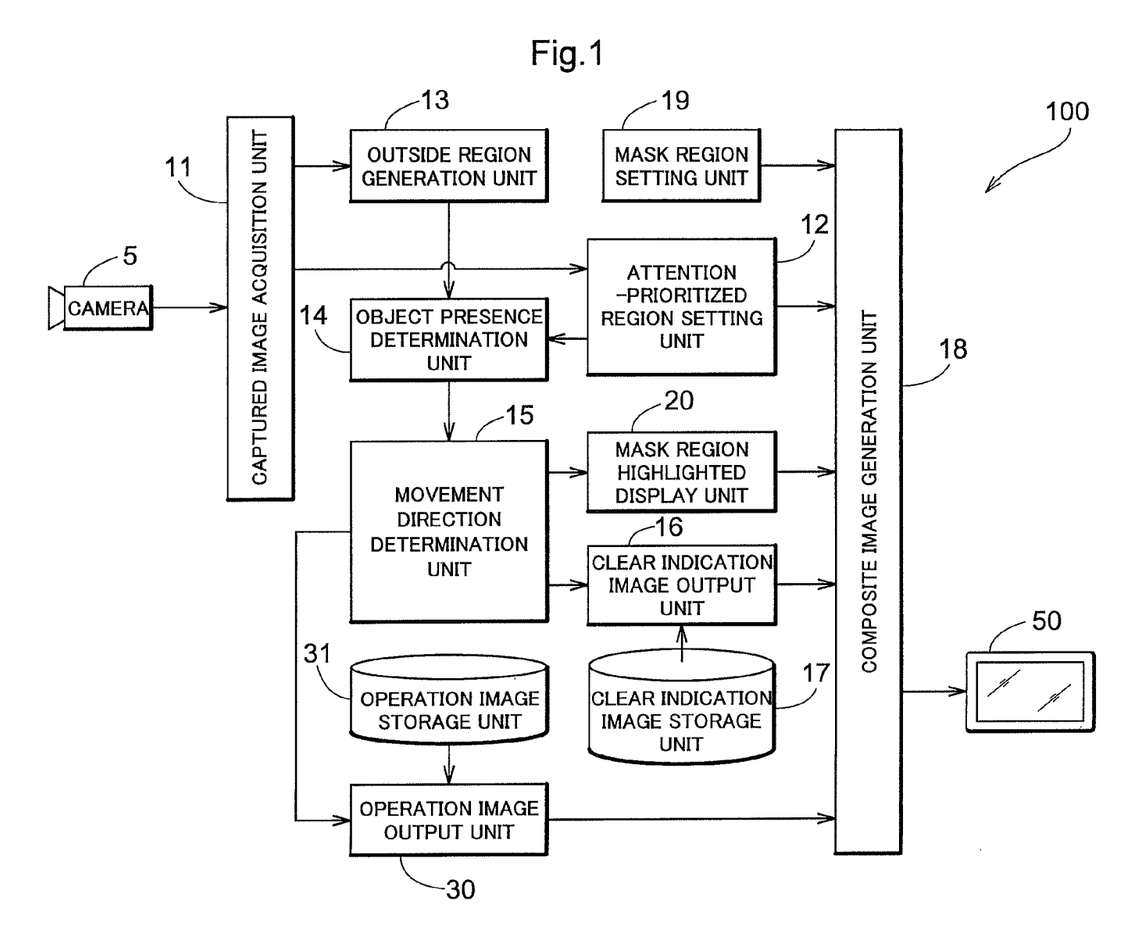
FIG. 1 is a block diagram schematically illustrating a configuration of an obstacle alarm device.

FIG. 1 is a block diagram schematically illustrating a configuration of an obstacle alarm device 100. As illustrated in FIG. 1, the obstacle alarm device 100 is configured to be provided with various functional units including a captured image acquisition unit 11, an attention-prioritized region setting unit 12, an outside region generation unit 13, an object presence determination unit 14, a movement direction determination unit 15, a clear indication image output unit 16, a clear indication image storage unit 17, a composite image generation unit 18, a mask region setting unit 19, a mask region highlighted display unit 20, an operation image output unit 30, and an operation image storage unit 31. Each of the aforementioned functional units adapted for performing various forms of processing for using a CPU as a core member to clearly indicate, to a driver of a vehicle 1, the approach of an object 7 is constructed of hardware, software, or both hardware and software.

Figure 2A:
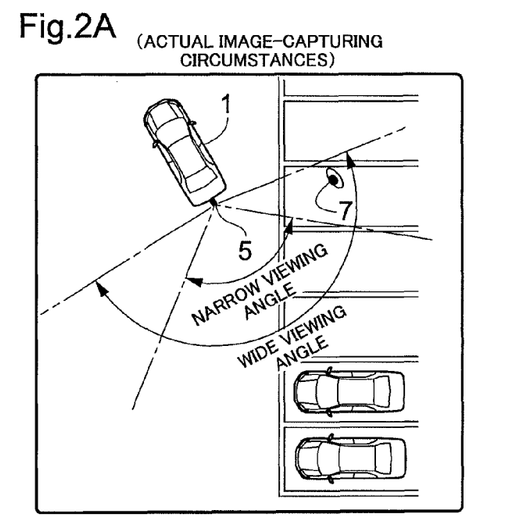
FIG. 2 is a drawing illustrating an example of processing in the obstacle alarm device according to the first embodiment.

The captured image acquisition unit 11 acquires a captured image G in which an image of a visual scene of a periphery of the vehicle 1 has been captured. Herein, a camera 5 is provided to the vehicle 1. The camera 5 in the present embodiment is constituted of a digital camera for outputting image-capturing information as video information, the digital camera having a built-in charge-coupled device (CCD), a complementary metal-oxide-semiconductor (CMOS) image sensor (CIS), or other imaging element. The camera 5 of such description, as is illustrated in FIG. 2A, is arranged in the vicinity of a license plate provided to an outside rear part of the vehicle 1, in the vicinity of an emblem provided to the outside rear part of the vehicle 1, or elsewhere, so as to have a slight angle of depression toward the rear of the vehicle 1. The camera 5 is configured so as to be provided with a wide-angle lens (not shown). This makes it possible to capture an image of the visual scene of the periphery of the vehicle 1 over a substantially 180° span of the rear of the vehicle 1. The image-capturing range of such description is indicated as a "wide viewing angle" in FIG. 2A. The camera 5 has the ability to output video as a captured image G in real-time. The captured image G of such description is transmitted to the captured image acquisition unit 11.

Figure 2B:
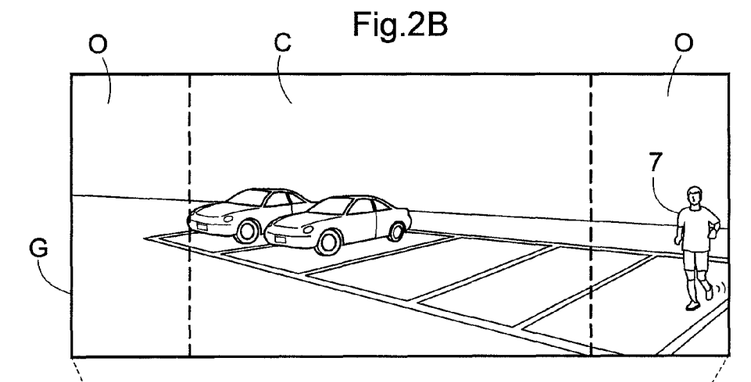

FIG. 2B illustrates an example of the captured image G of such description. The entire width of FIG. 2B corresponds to the wide viewing angle in FIG. 2A. Herein, the captured image G has undergone mirror image processing such that the object 7, which is on the left side when the rear is viewed from the vehicle 1 as per the illustration in FIG. 2A, is now on the right side within the captured image G, as illustrated in FIG. 2B. This is because when the visual scene of the rear of the vehicle 1 is displayed on the monitor 50, the driver of the vehicle 1 will be more readily able to comprehend, in a sensory manner, whether the object 7 included in the captured image G is present on the left side of the vehicle 1 or is present on the right side thereof.

The following description again relates to FIG. 1. The attention-prioritized region setting unit 12 sets an attention-prioritized region C to be the captured image G. In the present embodiment, the image-capturing range of the captured image G is the wide viewing angle. For this reason, the attention-prioritized region setting unit 12 sets the attention-prioritized region C to be the center portion of the captured image G. The captured image G is transmitted from the aforementioned captured image acquisition unit 11. In the present embodiment, the attention-prioritized region C is equivalent to a center portion of the captured image G in the lateral direction illustrated in FIG. 2B. The attention-prioritized region C of such description is preferably made to be, for example, a region about 120° to 130° to the rear of the vehicle 1, as per the "narrow viewing angle" in FIG. 2A.

The outside region generation unit 13 (equivalent in the present application to the "outside region setting unit") generates (sets) an outside region O to be outside of the attention-prioritized region C. Specifically, an outside region O outside of the attention-prioritized region C pertaining to the captured image G is generated. As in the description above, the attention-prioritized region C is generated by the attention-prioritized region setting unit 12 in the center portion of the captured image G in the lateral direction. The outside region generation unit 13 generates the outside region O, as in FIG. 2B, on the outside in the lateral direction of the attention-prioritized region C of such description. The outside region O generated by the outside region generation unit 13 is transmitted to the object presence determination unit 14, which shall be described below. In the present obstacle alarm device 100, the outside region O of such description and the aforementioned attention-prioritized region C correspond to a display image to be displayed on the monitor 50, which shall be described below (see FIG. 2C).

The object presence determination unit 14 determines whether or not the object 7 is present in a region corresponding to the outside region O. The outside region O is transmitted from the outside region generation unit 13. The "region corresponding to the outside region O" is a region in real-space corresponding to the outside region O. In the present embodiment, the determination of whether or not the object 7 is present in the region corresponding to the outside region O is performed referring to the outside region O and using, for example, pattern matching or another known form of image recognition processing. It will be readily understood that processing other than pattern matching can be used to determine whether or not the object 7 is present in the outside region O. The determination results from the object presence determination unit 14 are transmitted to the movement direction determination unit 15, which shall be described below.

The movement direction determination unit 15 determines a movement direction of the object 7 in the outside region O. The determination of the movement direction of such description is performed in a case where a determination has been made by the object presence determination unit 14 that the object 7 is present in the outside region O. In particular, in the present embodiment, a determination is made by the movement direction determination unit 15 as to whether or not the object 7 in the outside region O is moving toward the attention-prioritized region C. "Moving toward the attention-prioritized region C" indicates movement behind the vehicle 1 from outside the width direction of the vehicle 1 and in the direction of being directly behind the vehicle 1. The determination of such description can possibly also be performed by, for example, comparing the position of the object 7 in the most recent captured image G and the position of the object 7 in the captured image G from a predetermined duration of time prior, or can be performed using a known technique such as one using optical flow. The determination results of the movement direction of such description are transmitted to the clear indication image output unit 16, which shall be described below.

In a case where the movement direction determination unit 15 has determined that the object 7 in the outside region O is moving toward the center of the attention-prioritized region C, the clear indication output unit 16 causes a sign S, which is turned on for a fixed duration of time and thereafter turned off, to be displayed at sequentially varying positions centerward from the side of the outside region O where the object 7 is present, within the attention-prioritized region C in which the object 7 is present, and repeatedly performs the relevant displaying. Accordingly, in a case where the object 7 in the outside region O is moving toward the center of the attention-prioritized region C, the clear indication image output unit 16 causes the sign S, which is turned on for a fixed duration of time and thereafter turned off, to be displayed at sequentially varying positions centerward from the side of the outside region O pertaining to the attention-prioritized region C in which the object 7 is present, and repeatedly performs the relevant displaying. The question of whether or not the object 7 in the outside region O is moving toward the center of the attention-prioritized region C is determined by the aforementioned movement direction determination unit 15. The side of the outside region O pertaining to the attention-prioritized region C where the object 7 is present is equivalent to a region on the left side in the attention-prioritized region C in a case where the object 7 is in the outside region O on the left side, and is equivalent to a region on the right side in the attention-prioritized region C in a case where the object 7 is in the outside region O on the right side.

The sign S being turned off after having been turned on for a fixed duration of time indicates not a state where the sign S is being displayed continuously but rather a state where the sign S is displayed in a flashing manner. In the present embodiment, in a case where the sign S of such description is turned off after being displayed and is then displayed once more, the sign S is displayed at varying positions. Accordingly, the sign S enters a state of moving between two predetermined positions on the screen while flashing. The clear indication image output unit 16 repetitively moves the sign S while it flashes.

Figure 2C:
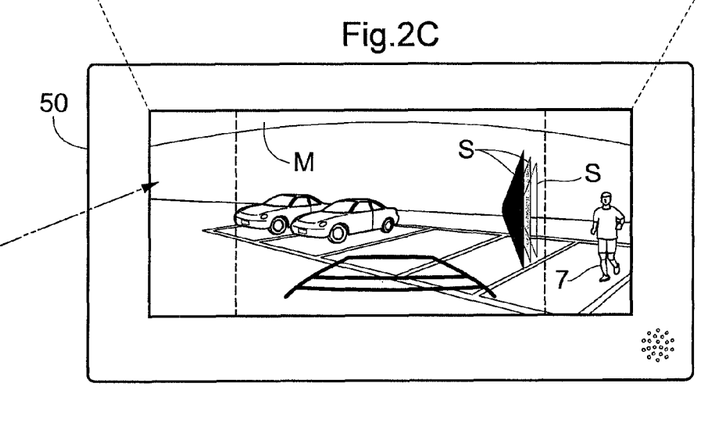
Figure 2D:
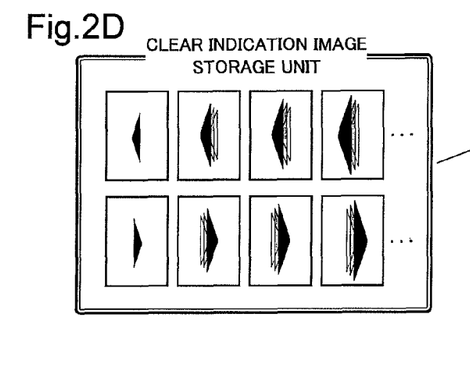

A description of the sign S shall now be provided. The sign S according to the present embodiment is configured to have an arrow shape having a convex part projecting toward the center of the attention-prioritized region C. The sign S of such description is stored in the clear indication image storage unit 17, as illustrated by FIG. 2D. FIG. 2C illustrates an image which is displayed on the monitor 50 of the vehicle 1 in a case where the object 7 is in the captured image G as illustrated in FIG. 2B, i.e., is in the outside region O on the right side. As illustrated in FIG. 2C, in the present embodiment, a plurality of the signs S are sometimes displayed on the monitor 50. In such a case, the plurality of signs S are displayed at positions where there is partial superimposition therebetween. "There is partial overlap", in the present embodiment, means that there is overlap between a portion of one of the plurality of the signs S, on the side of the convex part of the arrow shape, and a portion of another of the plurality of signs S, on the side of the arrow shape where there is no convex part. Further, the clear indication image output unit 16 is configured to superimpose the sign S displayed later on the sign S displayed immediately prior for the overlapping portion between the sign S to be displayed later and the sign S displayed immediately prior, in the case where there are the plurality of the signs S. Specifically, the configuration is such that the sign S to be displayed later is arranged on a higher layer than is the sign S displayed immediately prior. In the present embodiment, the sign S of such description being displayed immediately prior is displayed at a higher transparency than is the sign S to be displayed later. Specifically, the sign S to be displayed later is displayed at a lower transparency than is the sign S displayed immediately prior. Accordingly, in the case where a plurality of the signs S are displayed, the sign S on the uppermost layer has the lowest transparency, and the sign S on the lowermost layer has the highest transparency.

The sign S is further configured such that the sign S to be displayed later is of larger size than the sign S displayed immediately prior. Accordingly, in the case where a plurality of the signs S are displayed, the sign S on the uppermost layer has the largest size, and the sign S on the lowermost layer has the smallest size. The magnitude of size of each of the signs S may be set with mutually similar shapes, or the magnitude of size thereof may be set with either the longitudinal or lateral length of the sign S having been altered.

The clear indication image output unit 16 repeatedly performs the display of such description. Herein, in the present embodiment, as illustrated in FIG. 2C, the sign S is composited onto the attention-prioritized region C and displayed on the monitor 50. In view whereof, the composite image generation unit 18 generates a composite image where the sign S is composited onto the attention-prioritized region C. The image as per the illustration in FIG. 2C is thereby generated. Further, as per the description above, the outside region O is also displayed on both sides of the attention-prioritized region C.

Displaying the sign S in such a manner makes it possible to cause the sign S to be displayed so as to gradually become larger. This makes it possible to visually provide a clear indication to the occupant of the vehicle 1 that the object 7 is approaching the vehicle 1.

The mask region setting unit 19 sets a mask region M where at least a part of the visual scene of the periphery of the vehicle 1 pertaining to the captured image G is not to be displayed. In the present embodiment, the mask region M is set to be an upper part of the screen, i.e., to be a top-side portion within the display image displayed on the monitor 50, as illustrated in FIG. 2C. The "display image displayed on the monitor 50" is an image of the attention-prioritized region C and the outside region O. This mask region M is formed over both sides of the display image in the lateral direction. The inside of the mask region M is displayed superimposed at semi-transparency onto the visual scene above the vehicle 1, and is colored with, for example, a black color. It will be readily understood that the coloring may be done with another color. The visual scene above the vehicle 1 may also be filled in so as not to be visible. The mask region M may also be made not to be displayed.

Figure 3A:
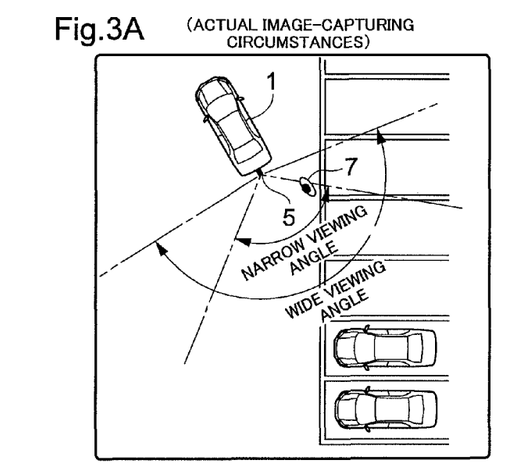
FIG. 3 is a drawing illustrating an example of processing in the obstacle alarm device according to the first embodiment.
Figure 3B:
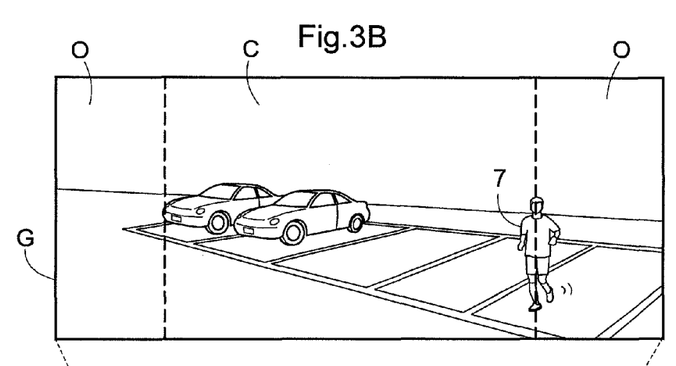
Figure 3C:
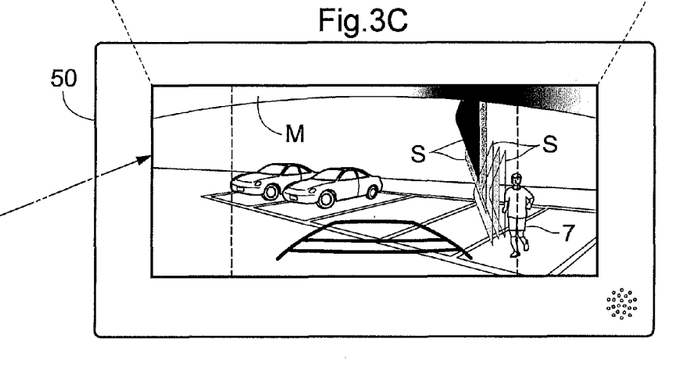
Figure 3D:
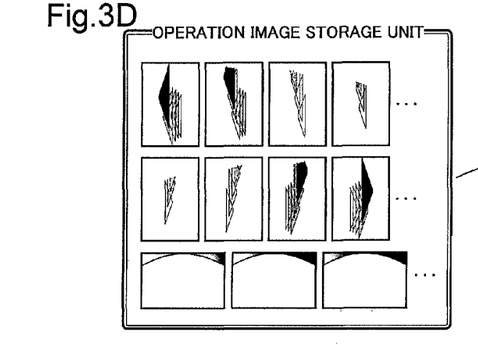
Figure 4A:
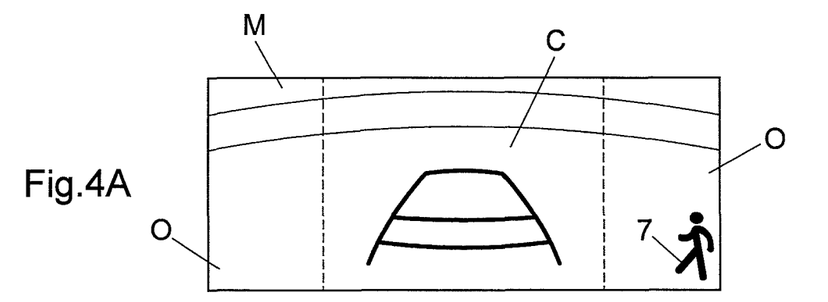
FIG. 4 is a drawing illustrating an example of a composite image according to the first embodiment.
Figure 4B:
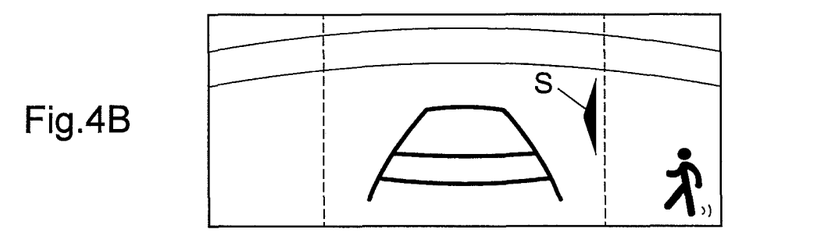
Figure 4C:
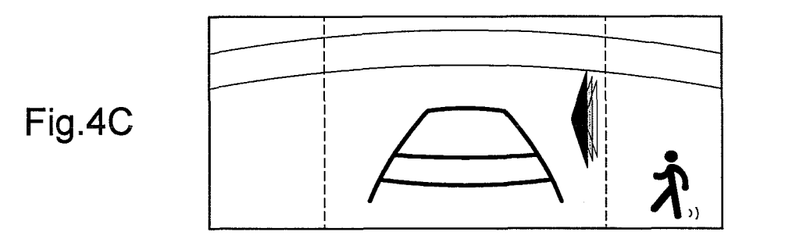
Figure 4D:
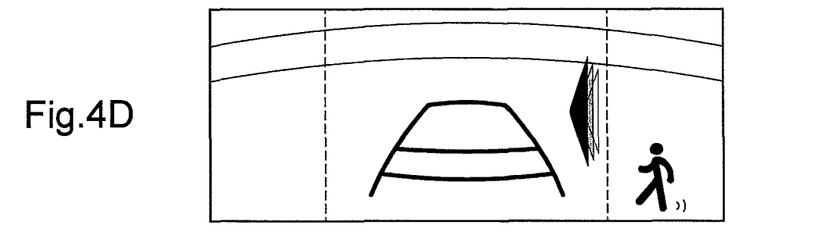
Figure 4E:
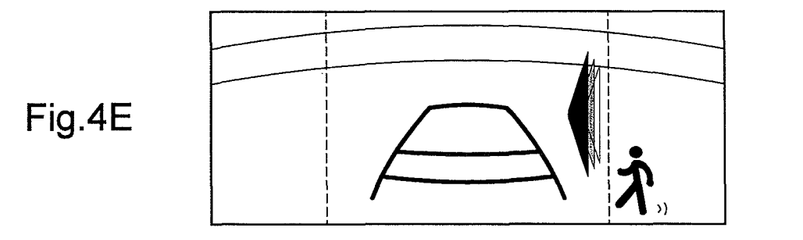
Figure 5A:
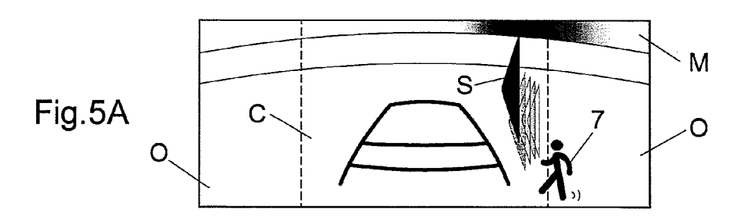
FIG. 5 is a drawing illustrating an example of the composite image according to the first embodiment.
Figure 5B:
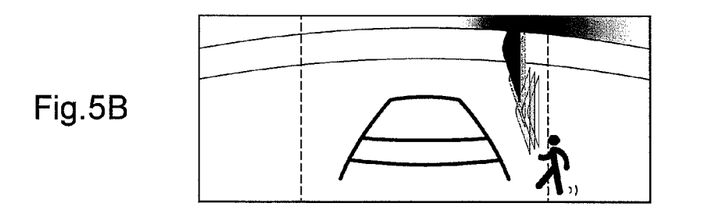
Figure 5C:
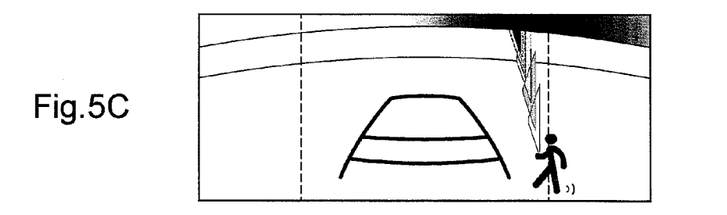
Figure 5D:
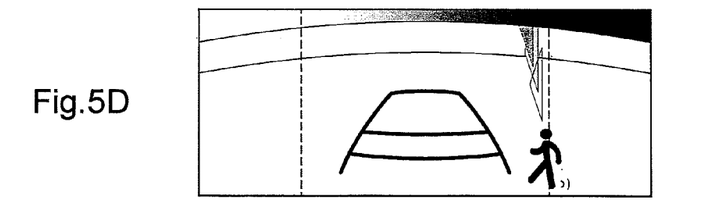
Figure 5E:
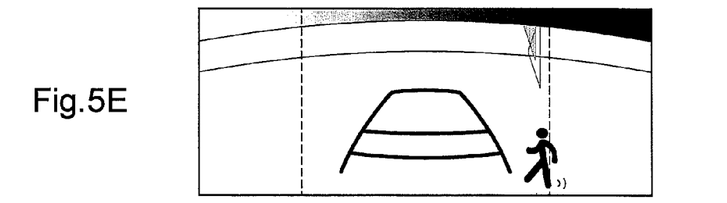
Figure 5F:
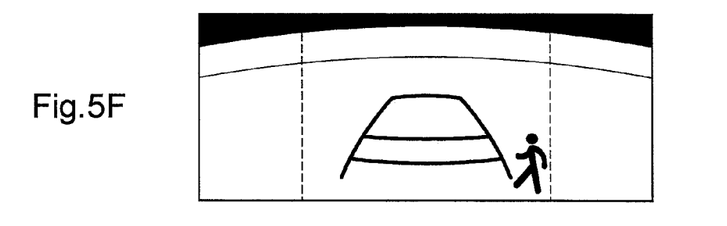

In the case where the object 7 in the outside region O has entered into the attention-prioritized region C, the operation image output unit 30 outputs an image where the sign S is absorbed from a boundary part between the attention-prioritized region C and the outside region O on the side of the mask region M where the object 7 is present (see FIG. 3D). The question of whether or not the object 7 in the outside region O has entered into the attention-prioritized region C is determined by the movement direction determination unit 15. The side of the mask region M where the object 7 is present refers to a right side part of the mask region M in a case where the object 7 is present on the outside region O of the right side, and refers to a left side part of the mask region M in a case where the object 7 is present on the outside region O of the left side. "An image where the sign S is absorbed" refers to an image where the sign S is absorbed into the mask region M and disappears. The image of such description is pre-stored in the operation image storage unit 31.

Herein, the sign S is displayed on the outside region O pertaining to the attention-prioritized region C where the object 7 is present. For this reason, as illustrated in FIG. 3C, in the case where the object 7 has entered into the attention-prioritized region C, causing the sign S to be absorbed into the mask region M makes it possible to produce a display without causing the sign S to hide the object 7 having entered into the attention-prioritized region C. Accordingly, it is possible to appropriately provide a clear indication of the presence of the object 7 to the driver of the vehicle 1.

The operation image output unit 30 is configured so as to alter the display color of the mask region M from the position where the sign S has been absorbed, in accompaniment with the absorption of the sign S into the mask region M. Specifically, in a case where the sign S has been absorbed from the boundary part between the attention-prioritized region C and the outside region O on the right side, an image where the mask region M is colored in toward both outer sides of the mask region M from the boundary part between the attention-prioritized region C and the outside region O on the right side is outputted, and in a case where the sign S has been absorbed from the boundary part between the attention-prioritized region C and the outside region O on the left side, an image where the mask region M is colored in toward both outer sides of the mask region M from the boundary part between the attention-prioritized region C and the outside region O on the left side is outputted. Coloring the mask region M in this manner makes it also possible to provide a clear indication, to the driver of the vehicle 1, of the side from which the object 7 has entered.

FIGS. 4 and 5 illustrate an example of a series of images where the sign S is displayed and, after the sign S has entered into the mask region M, the mask region M is being colored in. FIG. 4 illustrates an example where the sign S is displayed superimposed onto the attention-prioritized region C in a case where the object 7, which is in the outside region O, is moving toward the attention-prioritized region C. When, as illustrated in FIG. 5A, the object 7 enters into the attention-prioritized region C from the outside region O on the right side, the sign S enters into the mask region M as though being drawn in from the boundary part between the attention-prioritized region C and the outside region O on the right side, as illustrated in FIGS. 5B to 5E. In accordance therewith, the mask region M is sequentially colored in toward both outer sides of the mask region M, and ultimately the entirety of the mask region M is colored in (FIG. 5F).

The following description again refers to FIG. 1. The mask region highlighted display unit 20 highlights the display of the mask region M in a case where the object 7 in the outside region O has entered into the attention-prioritized region C. In the present embodiment, a "highlighted display" refers to a flashing display. The question of whether or not the object 7 in the outside region O has entered into the attention-prioritized region C is determined by the movement direction determination unit 15. The mask region highlighted display unit 20 causes the mask region M to flash in accordance with the determination results of the movement direction determination unit 15. This makes it possible to visually provide a clear indication to the driver of the vehicle 1 that the object 7 is present in the attention-prioritized region C.

The mask region highlighted display unit 20 discontinues the highlighted display of the mask region M in a case where the object 7 has withdrawn from the attention-prioritized region C. It is possible for the question of whether or not the object 7 has withdrawn from the attention-prioritized region C to also be determined by the movement direction determination unit 15. Specifically, it is possible for the movement direction determination unit 15 to determine that the object 7 has withdrawn from the attention-prioritized region C whenever there exists the object 7 entering into the outside region O from the attention-prioritized region C side of the outside region O. The determination result of such description is also transmitted to the mask region highlighted display unit 20. In the present embodiment, a "highlighted display" refers to a flashing display. Accordingly, the mask region highlighted display unit 20 discontinues the flashing of the mask region M whenever the determination result of such description is transmitted. This makes it possible to visually provide a clear indication to the driver of the vehicle 1 that the object 7 is not present in the attention-prioritized region C.

Figure 6:
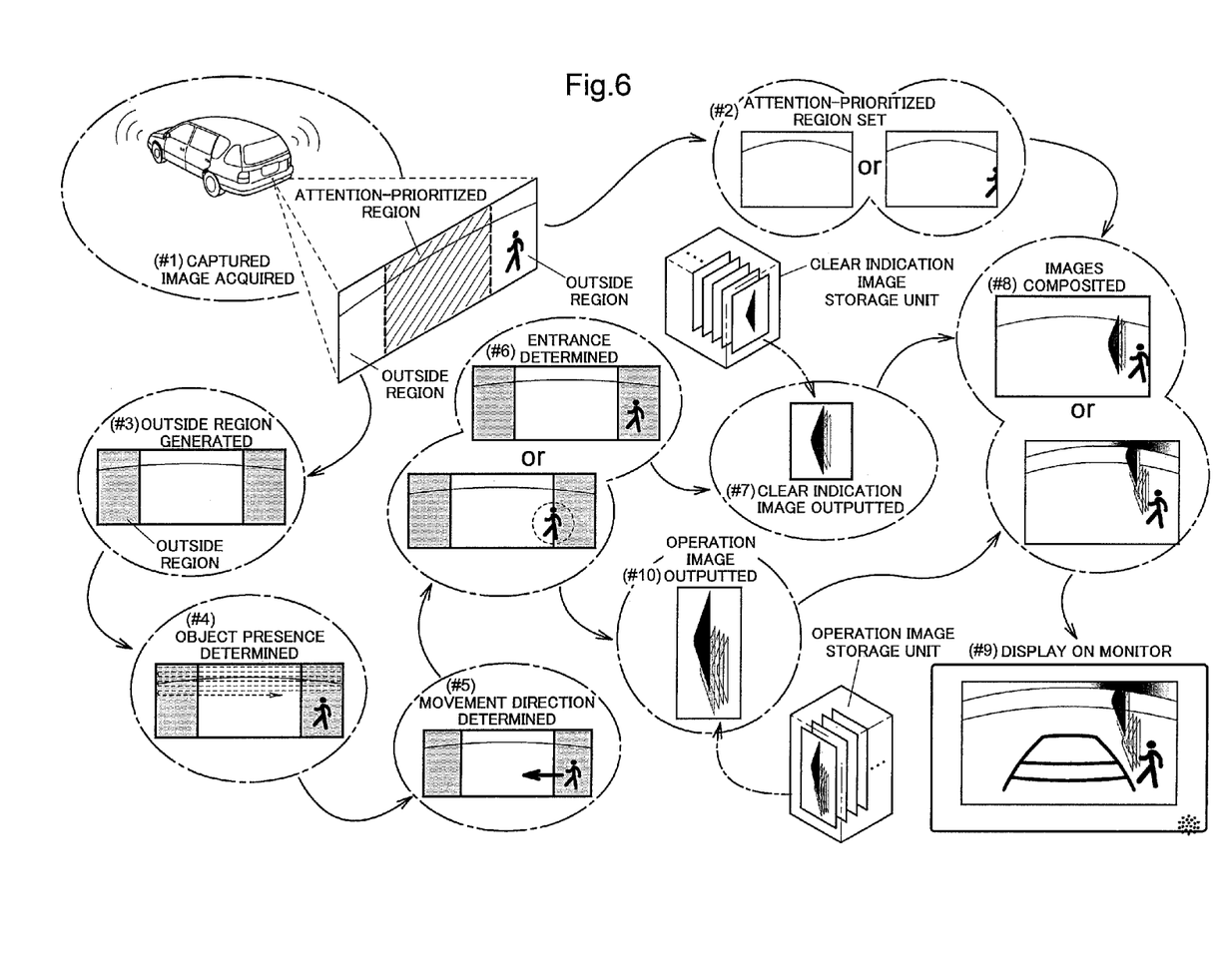
FIG. 6 is a drawing schematically illustrating processing in the obstacle alarm device according to the first embodiment.

Next, the schematic view of FIG. 6 shall be used to provide a description of the serial processing with which the obstacle alarm device 100 displays, on the monitor 50, the composite image where a clear indication image has been superimposed onto the captured image G. Firstly, the captured image acquisition unit 11 acquires the captured image G having been captured by the camera 5 of the vehicle 1 (step #1).

Next, the attention-prioritized region setting unit 12 sets the center portion of the acquired captured image G as the attention-prioritized region C (step #2). Meanwhile, the outside region generation unit 13 generates, as the outside region O, the two side portions of the acquired captured image G in the lateral direction (step #3). A determination is made by the object presence determination unit 14 as to whether or not the object 7 is present in the outside region O generated in this manner (step #4).

Whenever the object 7 is determined to be present in the outside region O, the movement direction of the object 7 is determined by the movement direction determination unit 15 (step #5). In a case where the movement direction of the object 7 is from the outside region O toward the attention-prioritized region C, a determination is further made as to whether or not the object 7 has entered into the attention-prioritized region C (step #6). Whenever the object 7 has not entered into the attention-prioritized region C, the clear indication image is outputted by the clear indication output unit 16 (step #7). This clear indication image is outputted by referring to the clear indication image stored in the clear indication image storage unit 17.

The composite image generation unit 18 generates the composite image by superimposing the clear indication image outputted in step #6 onto the attention-prioritized region C generated in step #2 (step #8). The generated composite image is displayed on the monitor 50 (step #9).

On the other hand, whenever, in step #6, the object 7 enters into the attention-prioritized region C, an operation image is outputted by the operation image output unit 30 (step #10). The operation image is outputted by referring to an operation image stored in the operation image storage unit 31.

The composite image generation unit 18 generates a composite image by superimposing the operation image outputted in step #10 onto the attention-prioritized region C generated in step #2 (step #8). The generated composite image is displayed on the monitor 50 (step #9).

Because, in this manner, the clear indication sign enters into the mask region M in accordance with the entry of the object 7 into the attention-prioritized region C, it is possible for the driver of the vehicle 1 to be alerted to the object 7 in the attention-prioritized region C. Accordingly, it is possible to be made aware of the circumstances of the periphery of the vehicle 1.

Because, according to the obstacle alarm device 100 according to the present invention, the sign S is displayed in this manner within the attention-prioritized region C in accordance with the object 7 approaching the vehicle 1, the presence and direction of the object approaching the vehicle 1 can be clearly indicated to the driver without there being a decrease in the visibility of the object 7 approaching the vehicle 1 nor in the visibility of the circumstances of the periphery of the vehicle 1. For this reason, the object 7 approaching the vehicle 1 will no longer go unnoticed even in a case where the screen size of the monitor 50 is small. In this manner, according to the present invention, it becomes possible for the presence of the obstacle (the object 7) approaching the vehicle 1 to be clearly indicated to the driver without it being harder to see the circumstances of the periphery of the vehicle 1.

2. Second Embodiment

Next, a description of the second embodiment according to the present invention shall now be provided. In the aforedescribed first embodiment, a description has been provided such that the sign S is constituted of an arrow shape having a convex part projecting toward the center of the attention-prioritized region C. In the second embodiment, a point of difference from the first embodiment resides in that the arrow-shaped sign S and also a sign S constituting a frame sign W are displayed. Other than, in particular, the display of the sign S constituting the frame sign W, the second embodiment is similar with respect to the first embodiment, and therefore the following description primarily relates to the differences.

The obstacle alarm device 100 according to the present embodiment is configured in a manner similar with respect to the first embodiment. For this reason, the obstacle alarm device 100 according to the present embodiment is similar with respect to the configuration illustrated in the block diagram of FIG. 1. The obstacle alarm device 100 according to the present embodiment, similarly with respect to the first embodiment, is also configured to be provided with various functional units including the captured image acquisition unit 11, the attention-prioritized region setting unit 12, the outside region generation unit 13, the object presence determination unit 14, the movement direction determination unit 15, the clear indication image output unit 16, the clear indication image storage unit 17, the composite image generation unit 18, the mask region setting unit 19, the mask region highlighted display unit 20, the operation image output unit 30, and the operation image storage unit 31. Each of the aforementioned functional units adapted for performing various forms of processing for using a CPU as a core member to clearly indicate, to a driver of a vehicle 1, the approach of an object 7 is constructed of hardware, software, or both hardware and software.

Figure 7A:
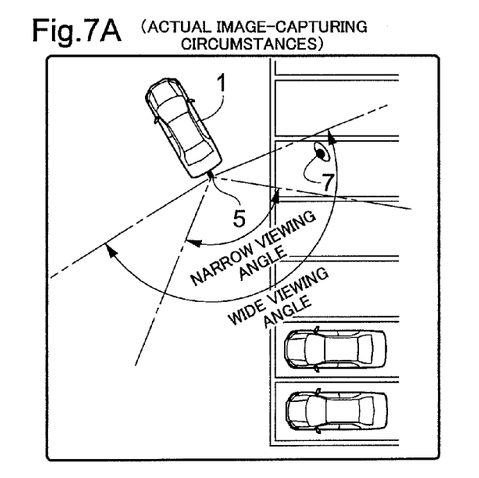
FIG. 7 is a drawing illustrating an example of processing in the obstacle alarm device according to a second embodiment.

The captured image acquisition unit 11 acquires the captured image G in which the image of the visual scene of the periphery of the vehicle 1 has been captured. Similarly with respect to the aforedescribed first embodiment, the captured image acquisition unit 11 uses the camera 5 provided to the vehicle 1 to acquire the captured visual scene of the periphery of the vehicle 1 over a substantially 180° span of the rear of the vehicle 1. The image-capturing range of such description is indicated as a "wide viewing angle" in FIG. 7A. The camera 5 has the ability to output video as a captured image G in real-time.

Figure 7B:
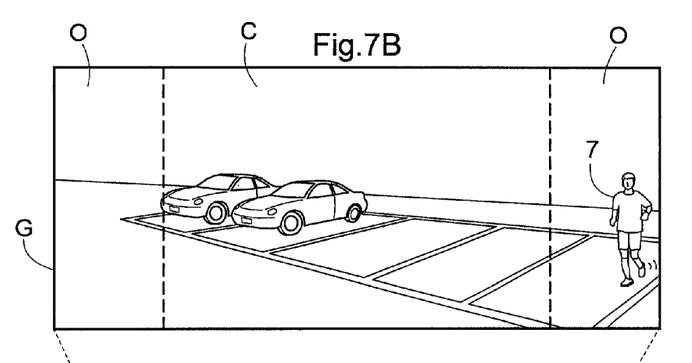

FIG. 7B illustrates an example of the captured image G of such description. The entire width of FIG. 7B corresponds to the wide viewing angle of FIG. 7A. In FIG. 7B, too, mirror image processing is performed for the display, similarly with respect to FIG. 2B.

The attention-prioritized region setting unit 12 sets the attention-prioritized region C to be the captured image G. In the present embodiment, the image-capturing range of the captured image G is the wide viewing angle. For this reason, the attention-prioritized region setting unit 12 sets the attention-prioritized region C to be the center portion of the captured image G. The captured image G is transmitted from the aforementioned captured image acquisition unit 11. In the present embodiment, the attention-prioritized region C is equivalent to the center portion of the captured image G in the lateral direction as illustrated in FIG. 7B. The attention-prioritized region C of such description is preferably made to be, for example, a region about 120° to 130° to the rear of the vehicle 1, as per the "narrow viewing angle" in FIG. 7A.

The outside region generation unit (equivalent in the present application to the "outside region setting unit") 13 generates (sets) the outside region O to be outside of the attention-prioritized region C. Specifically, the outside region O outside of the attention-prioritized region C pertaining to the captured image G is generated. In the present embodiment, too, the attention-prioritized region C is generated by the attention-prioritized region setting unit 12 to be the center portion of the captured image G in the lateral direction. The outside region generation unit 13 generates the outside region O as per FIG. 7B to be outside of the attention-prioritized region C in the lateral direction. The outside region O generated by the outside region generation unit 13 is transmitted to the object presence determination unit 14, which shall be described below. In the present obstacle alarm device 100, the outside region O of such description and the aforementioned attention-prioritized region C correspond to the display image displayed on the monitor 50, which shall be described below (see FIG. 7C).

The obstacle presence determination unit 14 determines whether or not the object 7 is present in the region corresponding to the outside region O. The outside region O is transmitted from the outside region generation unit 13. The "region corresponding to the outside region O" is the region in real-space corresponding to the outside region O. In the present embodiment, the determination of whether or not the object 7 is present in the region corresponding to the outside region O is performed referring to the outside region O and using, for example, pattern matching or another known form of image recognition processing. It will be readily understood that processing other than pattern matching can be used to determine whether or not the object 7 is present in the outside region O. The determination results from the object presence determination unit 14 are transmitted to the movement direction determination unit 15, which shall be described below.

The movement direction determination unit 15 determines the movement direction of the object 7 in the outside region O. The determination of the movement direction of such description is performed in a case where a determination has been made by the object presence determination unit 14 that the object 7 is present in the outside region O. In particular, in the present embodiment, a determination is made by the movement direction determination unit 15 as to whether or not the object 7 in the outside region O is moving toward the attention-prioritized region C. "Moving toward the attention-prioritized region C" indicates movement behind the vehicle 1 from outside the width direction of the vehicle 1 and in the direction of being directly behind the vehicle 1. The determination of such description can possibly also be performed by, for example, comparing the position of the object 7 in the most recent captured image G and the position of the object 7 in the captured image G from a predetermined duration of time prior, or can be performed using a known technique such as one using optical flow. The determination results of the movement direction of such description are transmitted to the clear indication image output unit 16, which shall be described below.

In a case where the movement direction determination unit 15 has determined that the object 7 in the outside region O is moving toward the center of the attention-prioritized region C, the clear indication output unit 16 causes the sign S, which is turned on for a fixed duration of time and thereafter turned off, to be displayed at sequentially varying positions centerward from the side of the outside region O where, in the attention-prioritized region C displayed together with the outside region O, the object 7 is present, and repeatedly performs the relevant displaying. Accordingly, in the present embodiment, too, the attention-prioritized region C and the outside region O are displayed on the monitor 50, but in the case where the object 7 in the outside region O is moving toward the center of the attention-prioritized region C, the clear indication image output unit 16 causes the sign S, which is turned on for a fixed duration of time and thereafter off, to be displayed at sequentially varying positions centerward from the outer edge part of the attention-prioritized region C.

Herein, in the present embodiment, the sign S is equivalent to a part of the frame sign W composed of a frame shape for surrounding a predetermined region within the attention-prioritized region C. Herein, the frame shape for surrounding the predetermined region is inclusive of one of equivalent size to or of smaller size than that of the attention-prioritized region C. The frame sign W according to the present embodiment is configured to comprise the sign S. In the example illustrated in FIG. 7C, of the sides possessed by the frame sign W, a side displayed in the longitudinal direction is equivalent to the side of the outside region O on the right side where the object 7 is present. In the present embodiment, the arrow-shaped sign S described in the first embodiment above is also displayed. The form of display of the arrow-shaped sign S is similar with respect to the first embodiment, and therefore the following forgoes a description thereof. In the present embodiment, too, the question of whether or not the object 7 in the outside region O is moving toward the center of the attention-prioritized region C is determined by the movement direction determination unit 15, similarly with respect to the first embodiment.

The frame sign W is displayed at sequentially varying positions centerward from the outer edge part of the attention-prioritized region C, in accordance with the movement of the sign S, which is a part of the frame sign W, toward the center of the attention-prioritized region C. In the present embodiment, "is displayed at sequentially varying positions" indicates not a state where the frame sign W is being displayed continuously but rather a state where the frame sign W is displayed while moving in a flashing manner. Accordingly, the frame sign W is displayed so as to gradually become smaller. The clear indication image output unit 16 repeatedly moves the frame sign W of such description while it flashes.

Figure 7C:
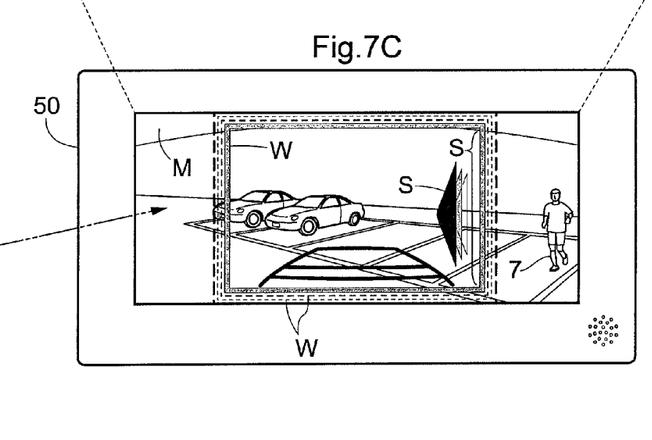
Figure 7D:
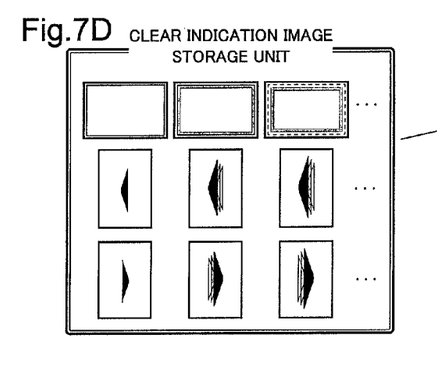
Figure 8A:
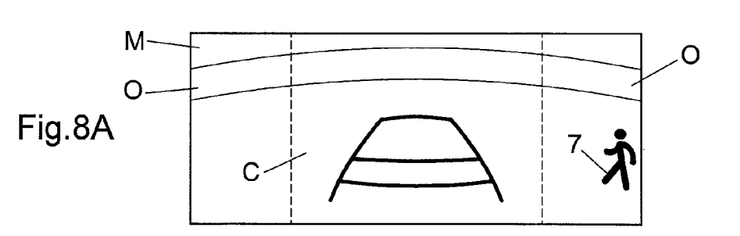
FIG. 8 is a drawing illustrating an example of a composite image according to the second embodiment.
Figure 8B:
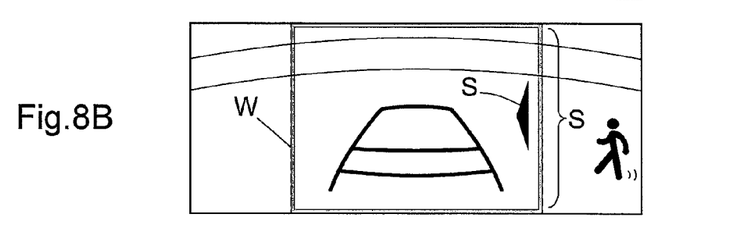
Figure 8C:
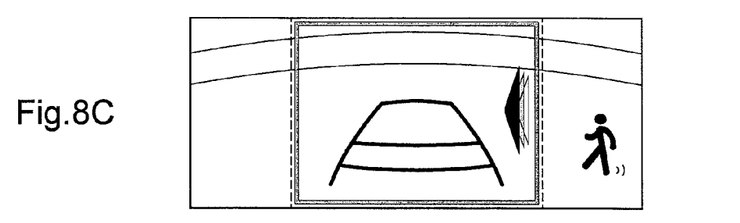
Figure 8D:
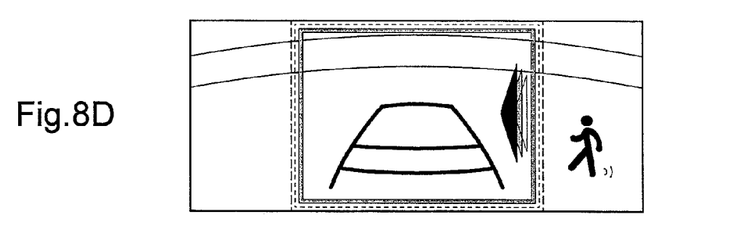
Figure 8E:
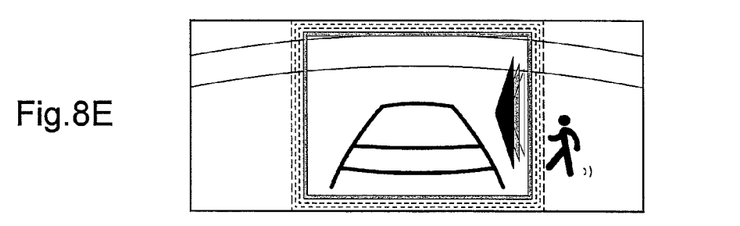
Figure 8F:
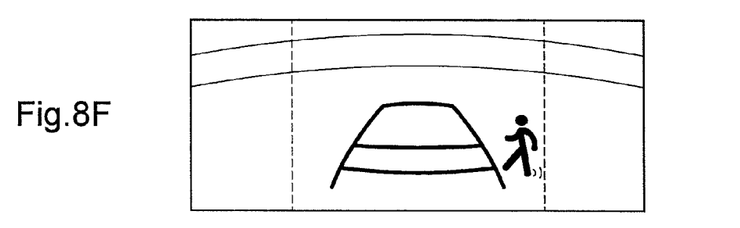

Herein, a description of the frame sign W shall now be provided. As illustrated in FIG. 7C, in the present embodiment, a plurality of the frame signs W are sometimes displayed on the monitor 50. In such a case, the frame sign W is configured such that a frame sign W to be displayed later is of smaller size than a frame sign W displayed immediately prior. The frame sign W is also configured such that the frame sign W to be displayed later has a lower transparency than does the frame sign W displayed immediately prior. This makes it possible to produce a display as though the frame sign W springs inward from the center side of the screen. The frame sign W of such description is stored in the clear indication image storage unit 17, as illustrated in FIG. 7D, together with the arrow-shaped sign S.

The clear indication image output unit 16 repeatedly performs such a display. Herein, in the present embodiment, the frame sign W is composited onto the attention-prioritized region C together with the arrow-shaped sign S and displayed on the monitor 50, as illustrated in FIG. 7C. In view whereof, the composite image generation unit 18 generates the composite image where the frame sign W and the arrow-shaped sign S have been composited onto the attention-prioritized region C. The image as per the illustration in FIG. 7C is thereby generated.

Displaying the frame sign W in such a manner makes it possible to cause the frame sign W to be displayed so as to be gradually approaching. This makes it possible to visually provide a clear indication to the occupant of the vehicle 1 that the object 7 is approaching the vehicle 1.

FIG. 8 illustrates an example of a series of images displaying the arrow-shaped sign S of such description and the sign S constituting the frame sign W. FIG. 8 illustrates an example where the arrow-shaped sign S and the sign S constituting the frame sign W are displayed superimposed onto the attention-prioritized region C in a case where the object 7, which is in the outside region O, is moving toward the attention-prioritized region C. The arrow-shaped sign S and the sign S constituting the frame sign W are repeatedly displayed until the object 7 enters into the attention-prioritized region C from the outside region O on the right side. Specifically, the display in FIGS. 8B to 8E is repeatedly performed. As illustrated in FIG. 8F, in a case where the object 7 enters into the attention-prioritized region C from the outside region O on the right side, the outputting of the arrow-shaped sign S and the frame sign W is discontinued by the clear indication image output unit 16. A configuration may be adopted such that thereupon, similarly with respect to the first embodiment, the arrow-shaped sign S enters into the mask region M as though drawn in from the boundary part between the attention-prioritized region C and the outside region O on the right side whenever the object 7 enters into the attention-prioritized region C from the outside region O on the right side. It will be readily understood that the configuration can further be such that, in accordance therewith, the mask region M is sequentially colored in from both sides of the mask region M, and ultimately the entirety of the mask region M is colored in.

Figure 9:
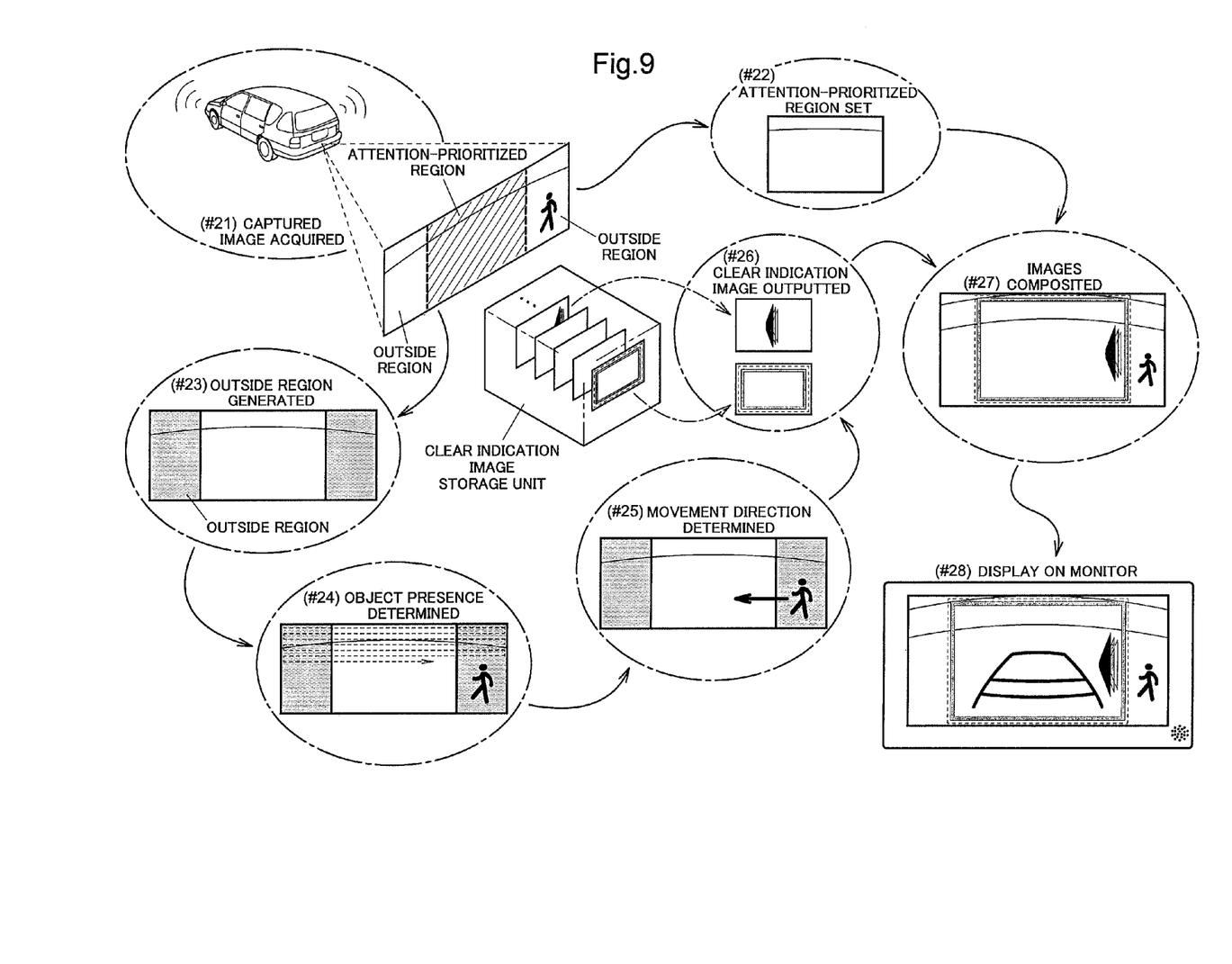
FIG. 9 is a drawing schematically illustrating processing in the obstacle alarm device according to the second embodiment.

Next, the schematic view of FIG. 9 shall be used to provide a description of the serial processing with which the obstacle alarm device 100 displays, on the monitor 50, the composite image where the frame sign W has been superimposed onto the attention-prioritized region C. Firstly, the captured image acquisition unit 11 acquires the captured image G having been captured by the camera 5 of the vehicle 1 (step #21).

Next, the attention-prioritized region setting unit 12 generates the center portion of the acquired captured image G as the attention-prioritized region C (step #22). Meanwhile, the outside region generation unit 13 generates, as the outside region O, the two side portions of the acquired captured image G in the lateral direction (step #23). A determination is made by the object presence determination unit 14 as to whether or not the object 7 is present in the outside region O generated in this manner (step #24).

Whenever the object 7 is determined to be present in the outside region O, the movement direction of the object 7 is determined by the movement direction determination unit 15 (step #25). In a case where the movement direction of the object 7 is from the outside region O toward the attention-prioritized region C, the clear indication image is outputted by the clear indication image output unit 16 (step #26). This clear indication image is outputted by referring to the clear indication image stored in the clear indication image storage unit 17.

The composite image generation unit 18 generates the composite image by superimposing the clear indication image outputted in step #26 onto the attention-prioritized region C generated in step #22 (step #27). The generated composite image is displayed on the monitor 50 (step #28). This manner of displaying the clear indication image (the arrow-shaped sign S and the frame sign W) on the attention-prioritized region C makes it possible for the driver of the vehicle 1 to be alerted to the vicinity of the vehicle 1. Accordingly, it is possible to become aware of the circumstances of the periphery of the vehicle 1, and it becomes possible to clearly indicate that the obstacle is approaching.

In this manner, according to the obstacle alarm device 100 according to the present invention, because the frame sign W is displayed as the sign S within the attention-prioritized region C in accordance with the object 7 approaching the vehicle 1, the object 7 will no longer go unnoticed even in a case where the screen size of the monitor 50 is small. Further, because the frame sign W of such description is displayed on the side end part of the screen, it will also no longer be harder for the driver to see the circumstances of the periphery of the vehicle 1. Specifically, because the visual scene displayed on the end part of the screen will not be hidden by the frame sign W, it becomes possible to appropriately become aware of the object 7 even in a case where the object 7 rapidly springs out. Accordingly, it becomes possible to clearly indicate to the driver the presence of the obstacle (the object 7) approaching the vehicle 1, without making it difficult to see the circumstances of the periphery of the vehicle 1.

3. Other Embodiments

In the description of the embodiments above, the clear indication image output unit 16 produces a display such that the sign S displayed in a flashing manner gradually becomes larger while moving. However, in the present invention, the scope of applicability is not limited thereto. It will be readily understood that the sign S can also be displayed at the same size. It will also be readily understood that the display can also be such that the sign S gradually becomes smaller. It is still possible with such a configuration to appropriately provide a clear indication of the object 7 approaching the vehicle 1 to the driver of the vehicle 1.

In the description of the embodiments above, the sign S displayed immediately prior is more transparent than the sign displayed later. However, in the present invention, the scope of applicability is not limited thereto. For example, it will be readily understood that the sign S displayed immediately prior can be displayed at a lower transparency than the sign displayed later, or that the sign S displayed immediately prior can be displayed as though having the same transparency as the sign S displayed later.

In the description of the embodiments above, in a case where there are a plurality of the signs S, the plurality of the signs S are displayed at partially superimposed positions. However, the scope of applicability of the present invention is not limited thereto. Even in the case where the plurality of the signs S are displayed, it is still possible for the configuration to be such that there is no superimposition between the signs S.

In the description of the embodiments above, the sign S is configured to be arrow-shaped, having a convex part projecting toward the center of the attention-prioritized region C. However, the scope of applicability of the present invention is not limited thereto. It will be readily understood that the sign S can also be configured in another shape.

In the description of the embodiments above, the operation image output unit 30 is configured so as to alter the display color of the mask region M from the position where the sign S has been absorbed, in accompaniment with the absorption of the sign S into the mask region M. However, the scope of applicability of the present invention is not limited thereto. It is also possible for the configuration to be such that the display color of the mask region M is altered from a position different from the position where the sign S has been absorbed, in accompaniment with the absorption of the sign S into the mask region M. Alternatively, it will be readily understood that it is also possible for the configuration to be such that the display color of the mask region M is not altered, even though the sign S is being absorbed into the mask region M.

In the description of the first embodiment above, in a case where the object 7 in the outside region O has entered into the attention-prioritized region C, the operation image output unit 30 outputs an image where the sign S is absorbed from the boundary part between the attention-prioritized region C and the outside region O on the side of the mask region M where the object 7 is present. However, the scope of applicability of the present invention is not limited thereto. It is also possible for the configuration to be such that the clear indication output unit 16 discontinues the outputting of the sign S in a case where the object 7 has entered into the attention prioritized region C. The question of whether or not the object 7 has entered into the attention-prioritized region C is determined by the aforedescribed movement direction determination unit 15. In a case where the object 7 has entered into the attention-prioritized region C, the object 7 is displayed at the end part of the attention-prioritized region C. For this reason, outputting the sign S in this manner makes it possible for the sign S displayed at the end part of the attention-prioritized region C to be viewed by the driver of the vehicle 1 without being hidden by the sign S.

In the description of the embodiments above, there are sometimes pluralities of the sign S and the frame sign W displayed within the screen. However, the scope of applicability of the present invention is not limited thereto. It is also possible for the configuration to be such that the sign S and the frame sign W are each displayed one at a time within the screen, and possible for the configuration to be such that only the sign S is displayed.

In the description of the embodiments above, the determination of whether or not the object 7 is present is performed using, for example, pattern matching or another known form of image recognition processing. However, the scope of applicability of the present invention is not limited thereto. It will be readily understood that, for example, a detection can be made using sonar or the like.

In the description of the embodiments above, in a case where a determination has been made by the movement direction determination unit 15 that the object 7 in the outside region O is moving toward the center of the attention-prioritized region C, the sign S is displayed centerward from the side of the outside region O pertaining to the attention-prioritized region C where the object 7 is present. However, the scope of applicability of the present invention is not limited thereto. It will be readily understood that it is also possible for the configuration to be such that in the case where the determination has been made by the movement direction determination unit 15 that the object 7 in the outside region O is moving toward the center of the attention-prioritized region C, the sign S is displayed toward the center of the attention-prioritized region C from a boundary position between the attention-prioritized region C and the outside region O pertaining to the attention-prioritized region C where the object 7 is present.

In the description of the second embodiment above, in a case where there are a plurality of the frame signs W, the frame sign W to be displayed later is of smaller size than the frame sign W displayed immediately prior. However, in the present invention, the scope of applicability is not limited thereto. It will be readily understood that the frame signs W can also be displayed at the same size. It will further be readily understood that the frame signs W can also be displayed so as to gradually become larger. It is still possible with such a configuration to appropriately provide a clear indication of the object 7 approaching the vehicle 1 to the driver of the vehicle 1.

In the description of the second embodiment above, in the case where there are a plurality of the frame signs W, the frame sign W displayed later has a lower transparency than does the frame sign W displayed immediately prior. However, the scope of applicability of the present invention is not limited thereto. It will be readily understood that, for example, it is also possible for the frame sign W displayed immediately prior to be displayed at a lower transparency than is the frame sign W displayed later, and also possible for the frame sign W displayed immediately prior to be displayed at the same transparency as the frame sign W displayed later.

In the description of the second embodiment above, the frame sign W is illustrated with a quadrangle. However, the scope of applicability of the present invention is not limited thereto. It will be readily understood that it is also possible for the frame sign W to be constituted of a shape other than a quadrangle. Further, preferably, the frame sign W is configured to be colored in so as to more easily catch the attention of the occupant of the vehicle 1. In such a case, preferably, the coloring is done with, for example, a red color or a yellow color, but it will be readily understood that the coloring can also be done with another color. It is furthermore possible to also change the thickness of the line delineating the frame sign W as appropriate.

In the description of the embodiments above, the clear indication image output unit 16 repeatedly performs the display of the sign S. However, the scope of applicability of the present invention is not limited thereto. It will be readily understood that it is also possible for the configuration to be such that the display thereof is not performed repeatedly.

In the description of the second embodiment above, the arrow-shaped sign S and the sign S constituting the frame sign W are displayed. However, the scope of applicability of the present invention is not limited thereto. It will be readily understood that it is also possible for the configuration to be such that only the sign S constituting the frame sign W is displayed, without the arrow-shaped sign S being displayed.

In the description of the embodiments above, the determination of whether or not the object 7 is present in the outside region O is performed using a known form of image recognition processing. However, the scope of applicability of the present invention is not limited thereto. It will be readily understood that it is also possible for the configuration to be such that the question of whether or not the object 7 is present in the region in real-space corresponding to the outside region O is determined using sonar, a radar sensor, or the like.

INDUSTRIAL APPLICABILITY

The present invention can be used for an obstacle alarm device for clearly indicating the presence of an obstacle approaching a vehicle to an occupant thereof.

KEY

1 Vehicle
7 Object
11 Captured image acquisition unit
12 Attention-prioritized region setting unit
14 Object presence determination unit
15 Movement direction determination unit
16 Clear indication image output unit
100 Obstacle alarm device
C Attention-prioritized region
G Captured image
O Outside region
S Sign
W Frame sign

What is claimed is:

1. A method for an obstacle alarm, the method comprising:
   acquiring a captured image in which an image of a visual scene of a rearward periphery of a vehicle has been captured;
   setting an attention-prioritized region to be the captured image;
   setting an outside region to be outside the attention-prioritized region in the captured image;
   determining whether or not an object is present in the outside region;
   determining a movement direction of the object; and
   causing a sign to be displayed at sequentially varying positions centerward from a side of the outside region where the object is present, within the attention-prioritized region displayed together with the outside region, where it is determined that the object is moving toward the center of the attention-prioritized region, the sign configured to be arrow-shaped, comprising a convex part projecting toward the center of the attention-prioritized region,
   wherein the sign is displayed at varying positions and enters a state of moving between two predetermined positions on the screen while flashing.

2. The method for an obstacle alarm according to claim 1, wherein the display of the sign is repeatedly performed.

3. The method for an obstacle alarm according to claim 1, wherein, in a case where there are a plurality of the signs, the plurality of the signs are partially superimposed onto each other, and a sign displayed later is superimposed on a sign displayed immediately prior for an overlapping portion between the sign to be displayed later and the sign displayed immediately prior.

4. The method for an obstacle alarm according to claim 1, wherein the sign is a part of a frame sign made of a frame shape for surrounding a predetermined region within the attention-prioritized region.

5. The method for an obstacle alarm according to claim 4, wherein the frame sign is caused to be displayed at sequentially varying positions centerward from an outer edge part of the attention-prioritized region in accordance with the movement of a part of the frame sign toward the center of the attention-prioritized region.

6. The method for an obstacle alarm according to claim 4, wherein, in a case where there are a plurality of the frame signs, a frame sign to be displayed later is of smaller size than a frame sign displayed immediately prior.

7. The method for an obstacle alarm according to claim 4, wherein, in the case where there are a plurality of the frame signs, a frame sign displayed later is of lower transparency than a frame sign displayed immediately prior.

8. The method for an obstacle alarm according to claim 1, wherein the displaying of the sign is discontinued in a case where the object has entered the attention-prioritized region.

* * * * *